United States Patent
Zhong et al.

(10) Patent No.: US 11,618,166 B2
(45) Date of Patent: Apr. 4, 2023

(54) ROBOT OPERATING DEVICE, ROBOT, AND ROBOT OPERATING METHOD

(71) Applicant: FANUC CORPORATION, Yamanashi (JP)

(72) Inventors: Tingting Zhong, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 224 days.

(21) Appl. No.: 16/848,079

(22) Filed: Apr. 14, 2020

(65) Prior Publication Data
US 2020/0361092 A1 Nov. 19, 2020

(30) Foreign Application Priority Data

May 14, 2019 (JP) .............................. JP2019-091299

(51) Int. Cl.
*B25J 9/16* (2006.01)
*B25J 13/08* (2006.01)
*B25J 19/02* (2006.01)

(52) U.S. Cl.
CPC ........... *B25J 9/1689* (2013.01); *B25J 9/1602* (2013.01); *B25J 13/081* (2013.01); *B25J 19/02* (2013.01); *B25J 19/023* (2013.01)

(58) Field of Classification Search
CPC ................................... B25J 9/16; B25J 13/00
See application file for complete search history.

(56) References Cited

U.S. PATENT DOCUMENTS

| | | | |
|---|---|---|---|
| 2005/0102060 A1* | 5/2005 | Watanabe | G05B 19/4083 700/245 |
| 2006/0229766 A1 | 10/2006 | Setsuda | |
| 2014/0046486 A1* | 2/2014 | Mimura | B25J 19/023 294/213 |
| 2015/0224649 A1* | 8/2015 | Watanabe | G05B 19/4083 700/259 |
| 2015/0273689 A1* | 10/2015 | Ouchi | B25J 9/1612 901/31 |
| 2017/0282363 A1* | 10/2017 | Yamada | B25J 15/0071 |
| 2018/0024521 A1* | 1/2018 | Matsuura | B25J 13/06 700/83 |

(Continued)

FOREIGN PATENT DOCUMENTS

| | | |
|---|---|---|
| EP | 1710649 A2 | 10/2006 |
| EP | 3366433 A1 | 8/2018 |
| JP | H06-190756 A | 7/1994 |

(Continued)

OTHER PUBLICATIONS

Office Action dated Aug. 23, 2022 in corresponding Japanese Application No. 2019-091299; 7 pages including English-language translation.

*Primary Examiner* — Kira Nguyen
(74) *Attorney, Agent, or Firm* — Maier & Maier, PLLC

(57) ABSTRACT

A robot operating device includes a camera that is attached to a distal end of a robot arm or a position adjacent to the distal end and that acquires an image; a display which displays the image acquired by the camera; an operation-accepting unit which accepts an operation that is performed by an operator on the image displayed on the display unit; and a controller which moves the robot arm based on the operation accepted by the operation-accepting unit.

10 Claims, 6 Drawing Sheets

(56) References Cited

U.S. PATENT DOCUMENTS

2018/0222049 A1    8/2018  Suzuki et al.
2018/0243917 A1*  8/2018  Takemoto ................ B25J 13/06

FOREIGN PATENT DOCUMENTS

| | | |
|---|---|---|
| JP | H09-174468 A | 7/1997 |
| JP | 2006-289531 A | 10/2006 |
| JP | 2009-241247 A | 10/2009 |
| JP | 2011-101915 A | 5/2011 |
| JP | 2012179682 A | 9/2012 |
| JP | 2017-177294 A | 10/2017 |
| JP | 2018-126857 A | 8/2018 |
| JP | 2018-158429 A | 10/2018 |

\* cited by examiner

ROBOT OPERATING DEVICE, ROBOT, AND ROBOT OPERATING METHOD

CROSS-REFERENCE TO RELATED APPLICATIONS

This application is based on and claims priority to Japanese Patent Application No. 2019-091299 filed on May 14, 2019, the entire content of which is incorporated herein by reference.

FIELD

The present invention relates to a robot operating device, a robot, and a robot operating method.

BACKGROUND

In order to make a robot do a task, it is necessary to perform a teaching operation to teach the robot a motion according to the details of the task (refer to, for example, Japanese Unexamined Patent Application, Publication No. H06-190756, Japanese Unexamined Patent Application, Publication No. 2006-289531, Japanese Unexamined Patent Application, Publication No. 2018-126857, and Japanese Unexamined Patent Application, Publication No. 2009-241247).

SUMMARY

An aspect of this disclosure is a robot operating device including: a camera that is attached to a distal end of a robot arm or a position adjacent to the distal end and that acquires an image; a display that displays the image acquired by the camera; an operation-accepting unit which accepts an operation that is performed by an operator on the image displayed on the display; and a controller which moves the robot arm based on the operation accepted by the operation-accepting unit.

DETAILED DESCRIPTION OF EMBODIMENTS

Figure 1:
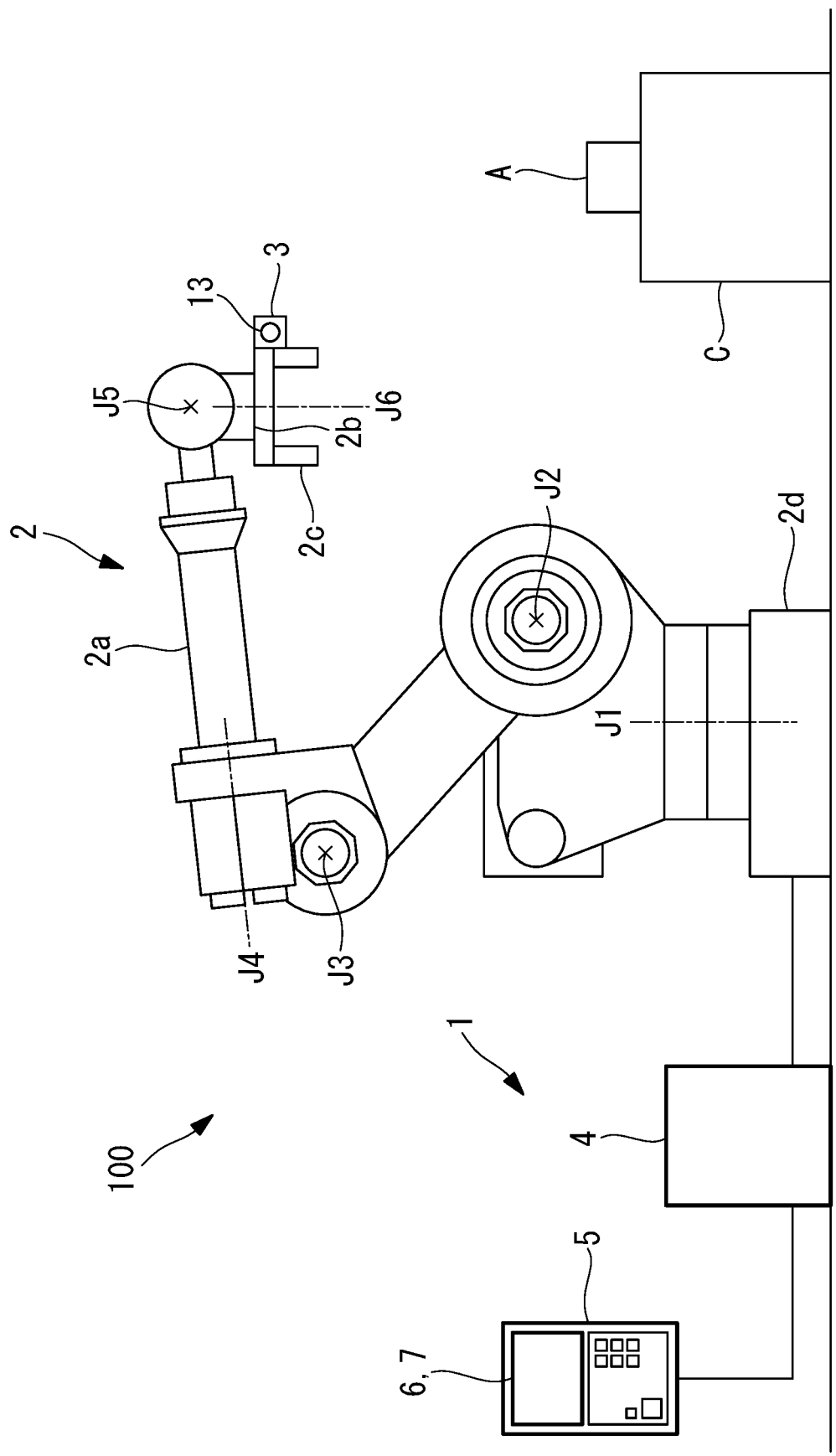
FIG. 1 is an overall configuration diagram of a robot according to one embodiment.

A robot operating device and a robot 100 according to one embodiment will now be described with reference to the drawings. As shown in FIG. 1, the robot 100 includes: a robot mechanical unit 2; a robot controller 1 for controlling the robot mechanical unit 2; and a camera 3 that is attached to the robot mechanical unit 2. The robot operating device includes at least the robot controller 1 and the camera 3.

The robot mechanical unit 2 includes a robot arm 2a having at least one joint, and a working tool 2c is connected to a wrist flange 2b at the distal end of the robot arm 2a. The robot mechanical unit 2 is, for example, a vertical articulated robot with six axes J1 to J6 and includes: servo motors for driving the individual joints of the robot arm 2a; and encoders for detecting the rotation angles of the individual joints. The tool 2c is, for example, a hand for gripping a task object A or a tool for carrying out the task of machining, inspection, welding, or the like on the task object A.

The camera 3 is a two-dimensional camera. The camera 3 is attached to the wrist flange 2b or a portion adjacent to the wrist flange 2b, for example, to the tool 2c. The camera 3 acquires a live view image B of the surroundings of the tool 2c, including the space in front of the tool 2c. The camera 3 may have an autofocus function for automatically focusing on an object, such as the task object A, in the field of view thereof. The camera 3 may be a three-dimensional camera. The camera 3 is temporarily attached to the wrist flange 2b or the tool 2c while a teaching mode is being executed. Alternatively, the camera 3 may be attached to the distal end portion of the robot arm 2a or the tool 2c at all times in order to recognize the task object A while the robot mechanical unit 2 is working.

The robot controller 1 includes: a control unit 4 that is connected to the robot mechanical unit 2 and the camera 3 and that controls the robot mechanical unit 2 and the camera 3; and a portable operation panel 5 that is connected to the control unit 4 and that is operated by an operator. The control unit 4 includes: a processor (not shown in the figure); and a memory unit (not shown in the figure) having a RAM, ROM, etc. The control unit 4 moves the robot arm 2a by transmitting control commands to each of the servo motors. In addition, the control unit 4 can calculate the position and orientation of the wrist flange 2b on the basis of a detected value from each of the encoders. The control unit 4 controls the robot mechanical unit 2 in either an automated mode or the teaching mode. The automated mode is a mode in which the robot mechanical unit 2 is controlled according to a motion program stored in the memory unit. The teaching mode is a mode in which the robot mechanical unit 2 is taught a motion by means of the operation panel 5.

Figure 2:
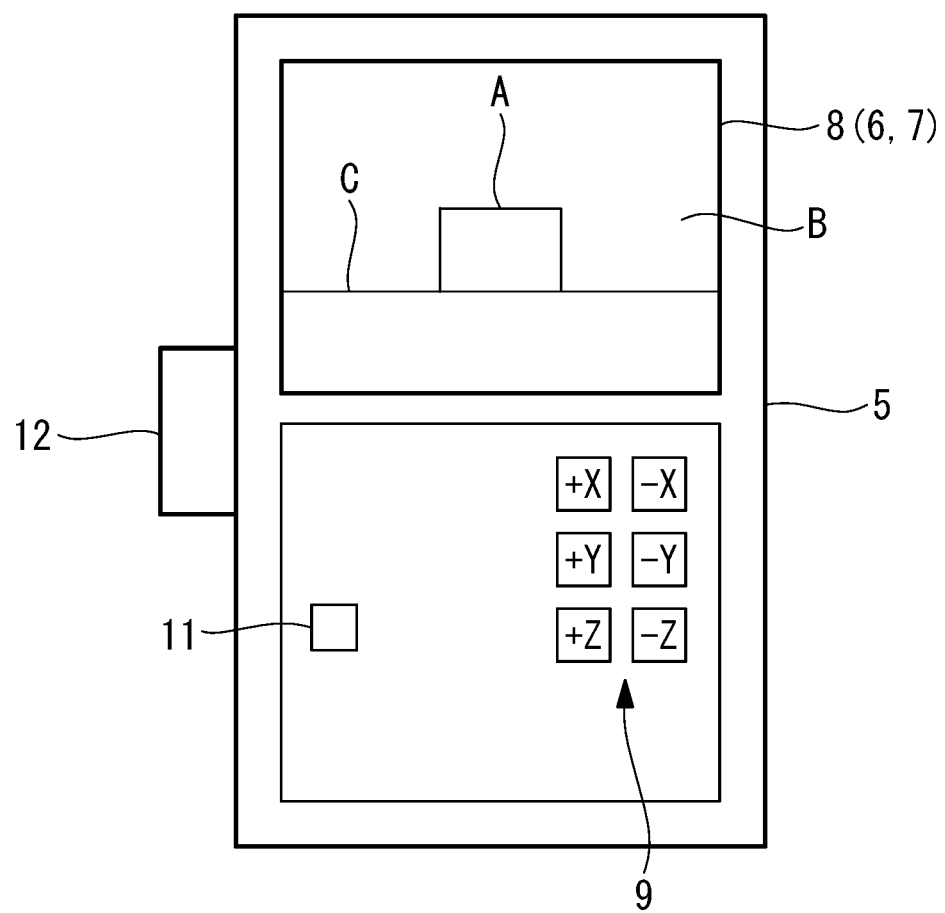
FIG. 2 is a diagram depicting one example of an operator's panel of a robot controller.

The operation panel 5 includes: a display unit 6 for displaying the image B acquired by the camera 3; and an operation-accepting unit 7 for accepting the operator operation on the image B displayed on the display unit 6. FIG. 2 shows one example of the operation panel 5. The operation panel 5 includes a touchscreen display 8 and jog buttons 9. The touchscreen display 8 and the jog buttons 9 are used for the operator to perform manual operation of the robot arm 2a in the teaching mode. The operator can move the wrist flange 2b in a desired direction by performing a touch operation on the touchscreen display 8, as described below. In addition, by pressing the jog buttons 9, the operator can move the wrist flange 2b in a desired direction by a predetermined distance at a time and can rotate the wrist flange 2b in a desired direction by a predetermined angle at a time. In addition, the operator may move the wrist flange 2b in a desired direction by tilting a separately provided joystick (not shown in the figure).

The operation panel 5 may include a selection switch 11 for switching between enabling and disabling the operation of the robot arm 2a by means of the touchscreen display 8 and the jog buttons 9. For example, the present invention may be configured such that either the touchscreen display 8 or the jog buttons 9 that have been selected with the selection switch 11 are enabled, whereas either the touchscreen display 8 or the jog buttons 9 that have not been selected are disabled. The operation panel 5 may include a deadman switch 12 for switching between enabling and disabling manual operation of the robot arm 2a. Manual operation of the robot arm 2a is enabled only while the deadman switch 12 is being pressed by a hand of the operator griping the operation panel 5.

The display unit 6 and the operation-accepting unit 7 constitute the touchscreen display 8. More specifically, the display unit 6 is a display panel, such as a liquid crystal panel or an organo-electroluminescence panel, and the operation-accepting unit 7 is a transparent touch panel (touch operation unit) disposed on the display panel. The live view image B acquired by the camera 3 is transmitted from the camera 3 to the operation panel 5 via the control unit 4 and is displayed on the display unit 6. The operation-accepting unit 7 accepts a tap operation, by means of a finger F of the operator, on the image B displayed on the display unit 6 and transmits, to the control unit 4, a move operation signal including information on the tap position of the finger F within the image B.

Figure 3:
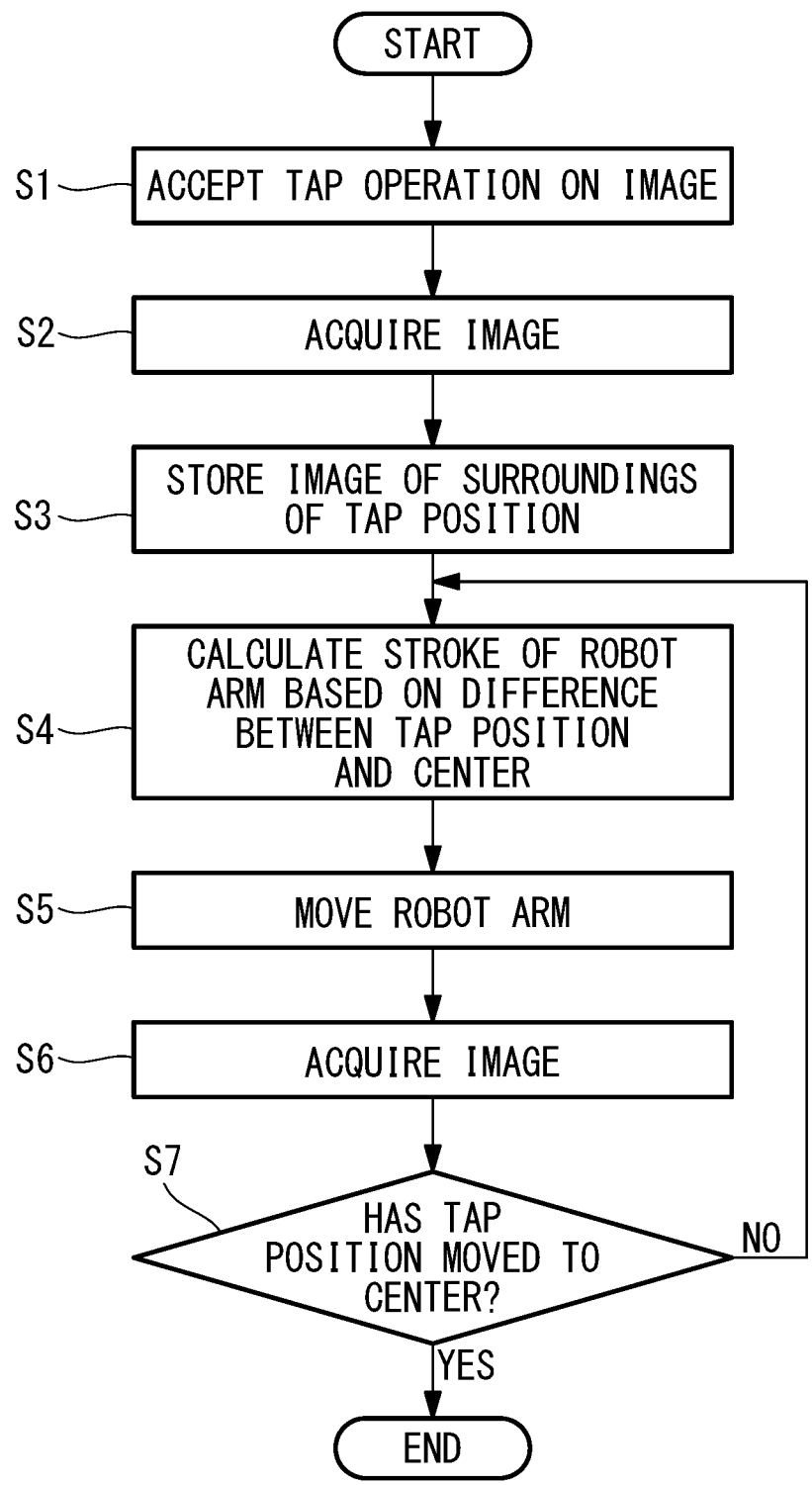
FIG. 3 is a flowchart showing the operation of the robot controller.

In the teaching mode, the control unit 4 controls the robot mechanical unit 2 and the camera 3 on the basis of a move operation signal from the operation-accepting unit 7. Next, a method for operating the robot mechanical unit 2 (robot operating method) in the teaching mode by means of the robot controller 1 will be described with reference to FIG. 3. The following processing and control by means of the control unit 4 are achieved as a result of the processor executing processing according to an operation program stored in the memory unit.

The control unit 4 causes the camera 3 to start acquiring the image B, for example, when the operation panel 5 is started or on the basis of a predetermined operation performed by the operator. First, the operator moves the robot arm 2a and arranges the robot arm 2a at a position at which the target position for teaching is observed in the image B displayed on the display unit 6. For example, if the position at which the task object A on a conveyor C is gripped by means of the tool 2c is the target position, the operator arranges the robot arm 2a at a position at which the task object A is observed in the image B. At this time, the robot arm 2a may be operated by operating any of the touchscreen display 8, the jog buttons 9, and the joystick. Alternatively, the operator may directly move the robot arm 2a by gripping a portion of the robot arm 2a.

Figure 4A:
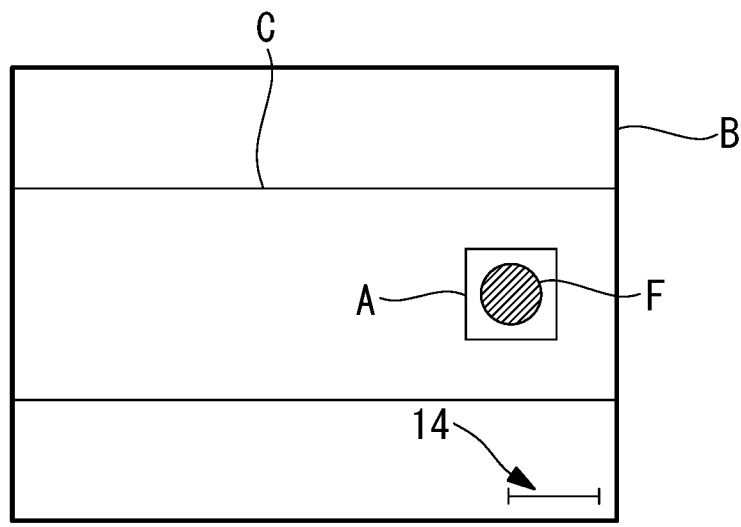
FIG. 4A is a diagram for illustrating a tap operation on an image.

Next, as shown in FIG. 4(a), the operator taps the position of the task object A in the image B displayed on the display unit 6. The tap operation performed by the operator on the image B is accepted by the operation-accepting unit 7, and a move operation signal is transmitted from the operation-accepting unit 7 to the control unit 4 (step S1). The control unit 4 responds to the move operation signal from the operation-accepting unit 7 and causes the camera 3 to capture a static image (step S2). Next, the control unit 4 receives the static image from the camera 3 and stores the static image. In addition, the control unit 4 cuts, from the static image, an image of the surroundings of the tap position, including the tap position, as a template image and stores the template image (step S3).

Next, the control unit 4 moves the robot arm 2a so that the tap position is arranged at a predetermined position in the image B (steps S4 to S7). The predetermined position is an arbitrary position in the image B, such as the center of the image B. The following description assumes that the predetermined position is the center of the image B. The control unit 4 calculates a stroke of the robot arm 2a necessary for moving the tap position to the center in the static image on the basis of the difference between the tap position and the center position (step S4). For example, the control unit 4 calculates the necessary stroke of the wrist flange 2b on the basis of a preset stroke of the robot arm 2a per pixel and the number of pixels between the tap position and the center position and then calculates the amount of rotation of each of the joints necessary for moving the wrist flange 2b by the calculated stroke. Next, the control unit 4 moves the robot arm 2a by the calculated stroke (step S5).

Figure 4B:
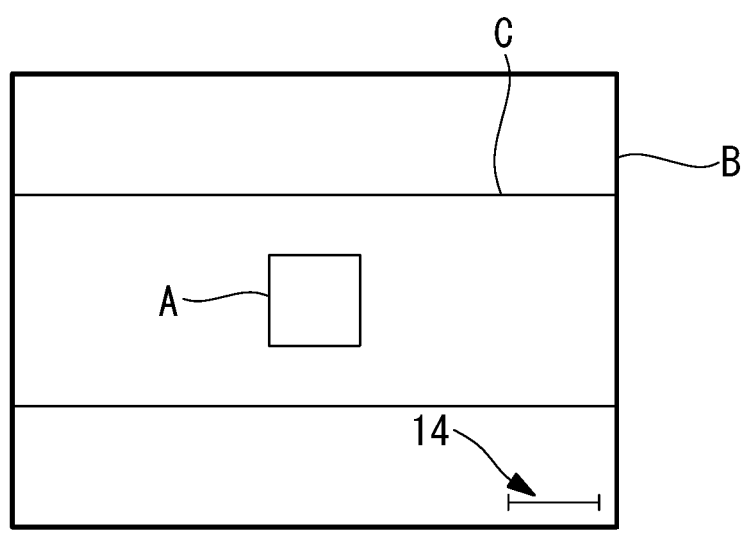
FIG. 4B is a diagram for illustrating a change in the image based on the tap operation.

Because the camera 3 moves as a result of the robot arm 2a being moved in step S5, the task object A moves towards the center in the image B displayed on the display unit 6, as shown in FIG. 4(b). At this time, the stroke of the task object A in the image B resulting from the robot arm 2a being moved differs depending on the distance between the camera 3 and the task object A. Therefore, after the robot arm 2a has been moved, the task object A at the tap position is not necessarily located at the center of the image B.

Next, the control unit 4 causes the camera 3 to capture a static image after the robot arm 2a has been moved (step S6) and receives the static image from the camera 3. Next, the control unit 4 cuts, from the static image after the robot arm 2a has been moved, an image of the surroundings of the center position, including the center position, and then determines whether or not the tap position has moved to the center by comparing the cut-off image of the surroundings with the template image (step S7). For example, the control unit 4 determines that the tap position has moved to the center if the displacement between the cut-off image of the surroundings and the template image is less than or equal to a predetermined value and determines that the tap position has not moved to the center if the displacement is greater than the predetermined value.

If the tap position has not moved to the center (NO in step S7), the control unit 4 calculates a stroke of the robot arm 2a necessary for moving the tap position to the center on the basis of the difference between the tap position and the center position in the static image received in step S6 (step S4) and then executes steps S5 to S7. The control unit 4 repeats steps S4 to S7 until the tap position moves to the center (YES in step S7).

When the task object A is arranged at the center or near the center in the image B as a result of steps S4 to S7 being executed, the robot arm 2a stops. Next, the operator presses a storage button (not shown in the figure) provided on the operation panel 5. As a result of the storage button being pressed, the position and posture of the robot arm 2a achieved when the task object A is located at the center of the image B are stored in the control unit 4.

As described above, according to this embodiment, the operator can move the robot arm 2a to the target position merely through the simple operation of observing the image B of the task object A displayed on the portable operation panel 5 and tapping, with the finger F, the position of the task object A in the image B. In other words, the operator, even situated at a position where he/she cannot directly look at the task object A, can observe the task object A via the camera 3 and therefore does not need to move or change his/her posture in order to observe the position of the robot arm 2a relative to the task object A. Therefore, for example, even in a situation in which the working space of the operator and the working space of the robot mechanical unit 2 are isolated from each other by a wall or in a situation in which the robot mechanical unit 2 is surrounded by many pieces of peripheral equipment, the operator can easily perform the operation of teaching the robot mechanical unit 2.

In addition, because the operator does not need to approach the robot mechanical unit 2, he/she can perform the operation of teaching the robot mechanical unit 2 at a position away from the robot mechanical unit 2. If the robot mechanical unit 2 is large, performing a teaching operation near the moving robot mechanical unit 2 is mentally burdensome to the operator. This embodiment can make such a teaching operation less burdensome to the operator.

After moving the robot arm 2a through a tap operation on the touchscreen display 8, the operator can arrange the position of the tool 2c with respect to the task object A more precisely by operating the jog buttons 9 or the joystick. As described above, the relationship between the stroke of the robot arm 2a and the stroke of the task object A in the image B differs depending on the distance between the camera 3 and the task object A. Furthermore, there is a spatial displacement between the position of the camera 3 and the position of the tool 2c. For these reasons, it is difficult to precisely arrange the position of the tool 2c with respect to the task object A though a tap operation on the image B. Therefore, rough position arrangement of the robot arm 2a though a tap operation on the touchscreen display 8 may be combined with precise position arrangement of the robot arm 2a by operating the jog buttons 9 or the joystick.

In the above-described embodiment, the processing in steps S6 and S7 by means of the control unit 4 may be omitted. In other words, the control unit 4 may move the robot arm 2a only once by the stroke calculated in step S4. In this case, it is the operator that determines whether or not the task object A has moved to the center in the image B displayed on the display unit 6. If the task object A has not moved to the center, the operator moves the robot arm 2a again by tapping the position of the task object A in the image B a second time. By doing so, the task object A more closely approaches the center in the image B. The operator can move the task object A to the center in the image B by repeating a tap operation multiples times.

In step S4, the control unit 4 may calculate the relationship between the stroke of the robot arm 2a and the stroke of an object in the image B and may calculate the stroke of the robot arm 2a on the basis of the calculated relationship. For example, in step S5, the control unit 4 first executes calibration processing for calculating the above-described relationship. In one example of such calibration processing, the control unit 4 moves the wrist flange 2b by a predetermined amount, calculates the stroke of the object between the static image obtained when the wrist flange 2b started moving and the static image obtained when the wrist flange 2b finished moving, and calculates the stroke of the object in the image B per stroke of the wrist flange 2b. By doing so, the stroke of the robot arm 2a necessary for moving the tap position to the center can be calculated more accurately. In particular, a required stroke of the robot arm 2a can be calculated more accurately by using, as the stroke of the object in the image B, the stroke of the task object A, which is the object at the tap position.

In the case where the position of the task object A also changes in the depth direction of the image B as the robot arm 2a is moved, the relationship between the stroke of the robot arm 2a and the stroke of the object in the image B changes over time. While the robot arm 2a is moving, the robot controller 1 may successively update the relationship between the stroke of the robot arm 2a and stroke of the object the in the image B by successively calculating the stroke of the object in the image B acquired by the camera 3, thereby re-calculating the stroke of the robot arm 2a on the basis of the updated relationship. By doing so, the stroke of the robot arm 2a necessary for moving the tap position to the center can be calculated more accurately.

At this time, the control unit 4 may calculate the stroke of an object specified by the operator in the image. For example, the operator specifies the task object A by performing a touch operation on the task object A among a plurality of objects in the image B displayed on the display unit 6. By doing so, the control unit 4 can calculate the stroke of the robot arm 2a appropriately on the basis of the stroke of the task object A in the image B.

A scale 14 indicating a reduced scale of the image B may be shown in the image B displayed on the display unit 6. For example, the robot controller 1 may create the scale 14 that indicates the actual distance between the robot arm 2a and the object in the image B on the basis of the relationship between the stroke of the robot arm 2a and the stroke of the object and may superimpose the scale 14 on the image B displayed on the display unit 6.

The above-described embodiment has been described by way of an example where the operation-accepting unit 7 accepts a tap operation as an operation for specifying an arbitrary position in the image B. Instead of this, the operation-accepting unit 7 may accept a different type of touch operation. For example, the operation-accepting unit 7 may accept a swipe operation on the image B. In this case, the operation-accepting unit 7 may transmit, to the robot controller 1, a move operation signal including the start point and the end point of a swipe operation, and the robot controller 1 may move the robot arm 2a so as to move the start point towards the end point (predetermined position).

The above-described embodiment has been described by way of an example where the operation-accepting unit 7 accepts a tap operation for specifying an arbitrary position in the image B. In addition to or instead of this, the operation-accepting unit 7 may accept a zoom command operation on the image B.

Figure 5A:
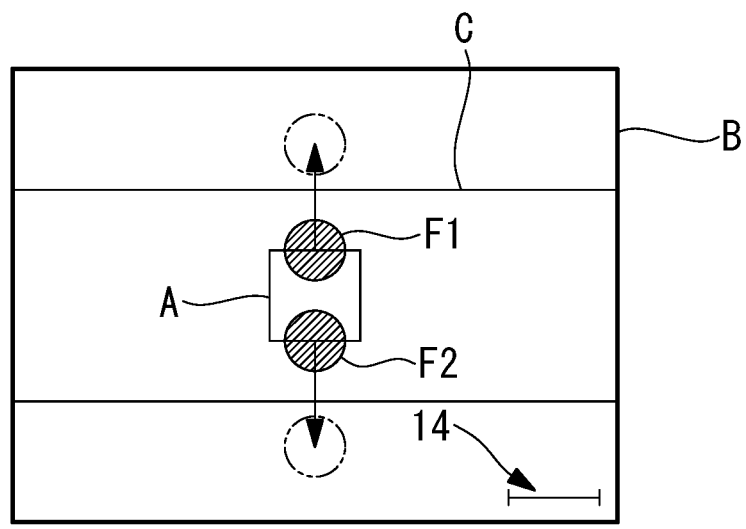
FIG. 5A is a diagram for illustrating a pinch-out operation on an image.

As shown in, for example, FIG. 5(a), the operation-accepting unit 7 accepts, as a zoom-in command and a zoom-out command, a pinch-out operation (touch operation) and a pinch-in operation (touch operation), respectively, on the image B displayed on the display unit 6. A pinch-out operation is the operation of increasing the distance between two fingers F1 and F2 that are in contact with the touchscreen display 8, and a pinch-in operation is the operation of reducing the distance between the two fingers F1 and F2 that are in contact with the touchscreen display 8. The operation-accepting unit 7 transmits a zoom-in operation signal or a zoom-out operation signal to the control unit 4.

Figure 5B:
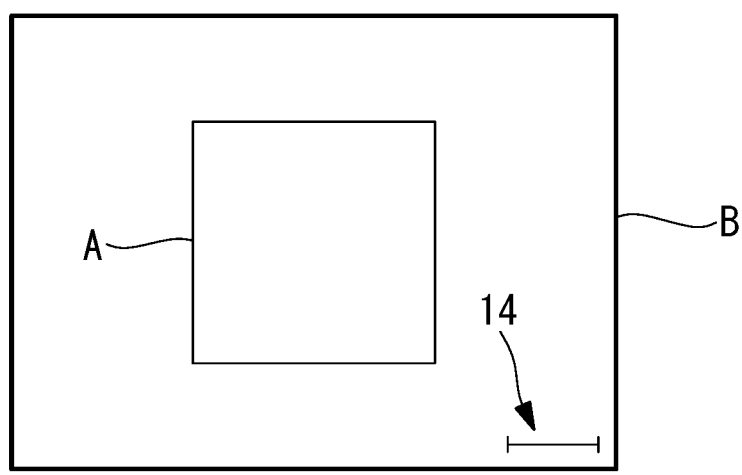
FIG. 5B is a diagram for illustrating a change in the image resulting from the pinch-out operation.

In response to the zoom-in operation signal from the operation-accepting unit 7, the control unit 4 moves the robot arm 2a so as to bring the wrist flange 2b closer to the task object A. By doing so, the camera 3 moves in the optical axis direction towards the task object A, and the task object A in the image B displayed on the display unit 6 is enlarged, as shown in FIG. 5(b). In addition, in response to the zoom-out operation signal from the operation-accepting unit 7, the control unit 4 moves the robot arm 2a so as to bring the wrist flange 2b away from the task object A. By doing so, the camera 3 moves in the optical axis direction away from the task object A, thereby reducing the task object A in the image B displayed on the display unit 6.

In the case where the operator visually checks the position of the tool 2c relative to the task object A, the operator needs to come very close to the tool 2c and the task object A in order to precisely arrange the position of the tool 2c with respect to the task object A. According to this embodiment, by displaying a magnified view of the task object A by means of the camera 3, the position of the tool 2c can be precisely arranged with respect to the task object A while the operator is situated at a position away from the tool 2c and the task object A.

The relationship between the stroke of the robot arm 2a and the stroke of the object in the image B changes along with a zoom operation. Therefore, the control unit 4 may change the stroke of the robot arm 2a according to a magnification change of the object in the image B resulting from a zoom operation. For example, when the object in the image B is magnified by a factor of three through a zoom-in operation, the control unit 4 may reduce the stroke of the robot arm 2a to one third of the stroke before the zoom-in operation.

In the case where the camera 3 has a zoom function, the control unit 4 may change the zoom magnification of the camera 3 by controlling the camera 3, instead of moving the camera 3 in the optical axis direction by moving the robot arm 2a. In short, the control unit 4 may increase the zoom magnification of the camera 3 in response to a zoom-in command and may decrease the zoom magnification of the camera 3 in response to a zoom-out command.

Figure 6A:
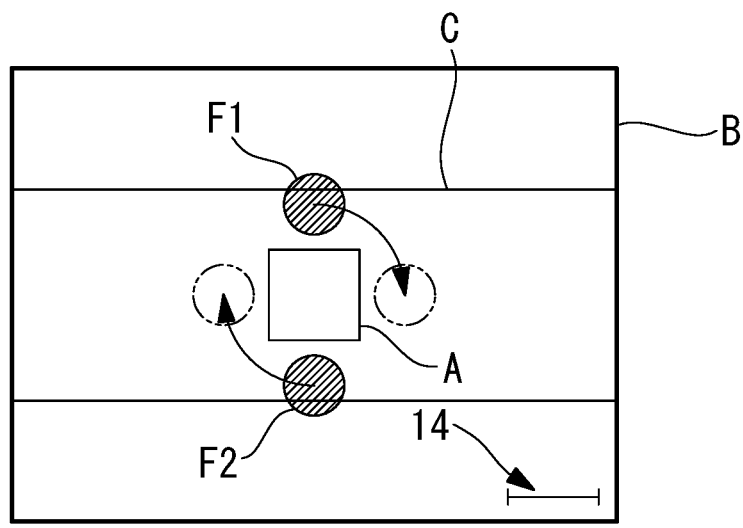
FIG. 6A is a diagram for illustrating a rotate operation on an image.
Figure 6B:
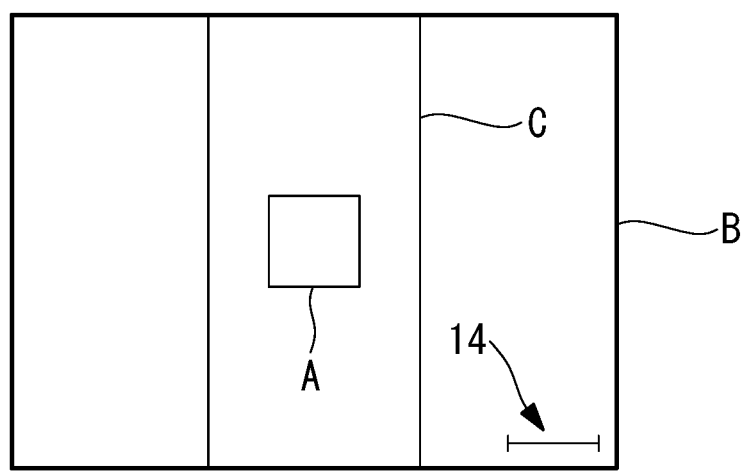
FIG. 6B is a diagram for illustrating a change in the image based on the rotate operation.

The operation-accepting unit 7 may accept an operation for a rotation command to the image B. As shown in, for example, FIG. 6(a), the operation-accepting unit 7 accepts, as a rotation command, the operation of rotating, clockwise or counterclockwise, the two finger F1 and F2 in contact with the touchscreen display 8 (touch operation). The operation-accepting unit 7 transmits, to the control unit 4, a rotate operation signal including information on the rotation direction and the rotation angle of the fingers F1 and F2. In response to the rotate operation signal from the operation-accepting unit 7, the control unit 4 rotates the wrist flange 2b in the direction corresponding to the rotation direction of the fingers F1 and F2 by the same angle as the rotation angle of the fingers F1 and F2. By doing so, the camera 3 rotates about the optical axis or about an axis parallel to the optical axis, and the task object A and the conveyor C rotate clockwise or counterclockwise in the image B displayed on the display unit 6, as shown in FIG. 6(b).

In the case where the optical axis of the camera 3 is decentered relative to the rotary axis J6 of the wrist flange 2b and is distant from the rotary axis J6, the image B rotates not about the center of the image B but about the rotary axis J6 when the wrist flange 2b rotates about the rotary axis J6. The control unit 4 may rotate the camera 3 about the rotary axis J6. Alternatively, in order to rotate the task object A in the image B about the center of the image B, the control unit 4 may move the robot arm 2a so that the camera 3 rotates about the optical axis of the camera 3 on the basis of the positional relationship between the optical axis of the camera 3 and the rotary axis J6.

In the above-described embodiment, the operation panel 5 may include a switch for switching between enabling and disabling the operation of the robot arm 2a by touch operation on the image B displayed on the display unit 6. Just like, for example, the deadman switch 12, this switch may enable the operation of the robot arm 2a through a touch operation on the image B only while being pressed by a hand of the operator. In addition, this switch may be provided for each of the move, zoom, and rotate operations.

The above-described embodiment may be configured so that the image B displayed on the display unit 6 is moved, zoomed, and rotated by digital processing on the basis of an operation on the image B. In this case, a switch for switching between enabling and disabling the operation of the robot arm 2a by each of the above-described touch operations is provided. When the operation of the robot arm 2a is disabled, the operation panel 5 applies digital processing to the image B on the basis of an operation on the image B and displays the digitally processed image B on the display unit 6.

The above-described embodiment has been described by way of an example where the operation-accepting unit 7 is a touch panel that accepts a touch operation on the image B. Instead of this, the operation-accepting unit 7 may accept an operation from another device, such as a mouse. For example, the operation-accepting unit 7 may accept, as an operation for specifying a position in the image B, a click operation on a mouse connected to the operation panel 5. In this case, the control unit 4 uses the click position, instead of the tap position, in the image B. In addition, the operation-accepting unit 7 may accept, as an operation for a zoom command on the image B, a rotate operation on a wheel of the mouse.

In the above-described embodiment, the control unit 4 may control the robot arm 2a while applying a predetermined restriction to the motion of the robot arm 2a. For example, the control unit 4 may move the wrist flange 2b and the camera 3 only in the horizontal direction by operating the robot arm 2a while keeping the wrist flange 2b at a certain vertical-direction position. Alternatively, the control unit 4 may move the wrist flange 2b and the camera 3 only about predetermined axes by rotating only predetermined joints among the joints.

Because the robot arm 2a of the vertical articulated robot mechanical unit 2 in the form of a robot having the six axes J1 to J6 has a high degree of freedom of motion, the operator may have difficulty estimating the motion of the robot arm 2a. By restricting the motion of the robot arm 2a and simplifying the motion of the wrist flange 2b and the camera 3, the operator can easily predict the motion of the robot arm 2a when an operation is applied to the image B, thereby making it easier to operate the robot arm 2a.

In the above-described embodiment, the robot controller 1 may further include a 9-axis sensor 13 attached to the camera 3, as shown in FIG. 1. The 9-axis sensor 13 includes a 3-axis acceleration sensor, a 3-axis angular velocity sensor, and a 3-axis geomagnetism sensor, thereby detecting the orientation of the camera 3 in a world frame, in addition to the position and the orientation of the camera 3 in a sensor coordinate system. The sensor coordinate system is a coordinate system that is fixed relative to the 9-axis sensor 13. The world frame is a coordinate system fixed relative to a base 2d of the robot mechanical unit 2 (i.e., relative to the ground surface or the floor surface) and is a coordinate system of the robot arm 2a used for the control unit 4 to control the robot arm 2a. Therefore, the control unit 4 can estimate, from a detected value of the 9-axis sensor 13, the motion (move path) and the orientation of the camera 3 in the world frame.

In the case where the 9-axis sensor 13 is provided, the control unit 4 may control the robot arm 2a so that the camera 3 moves in a predetermined direction in a predetermined orientation on the basis of the orientation of the camera 3 estimated from a detected value of the 9-axis sensor 13. For example, the control unit 4 may control the robot arm 2a so as to translate the camera 3 in the horizontal direction with the camera 3 oriented downward.

In the case where the camera 3 is attached to a position away from the wrist flange 2b, the motion of the wrist flange 2b differs from the motion of the camera 3. By directly detecting the motion of the camera 3 by means of the 9-axis sensor 13, the control unit 4 can perceive the relationship between the motion of the wrist flange 2b and the motion of the camera 3 and can thereby control the motion of the camera 3 via the motion of the robot arm 2a. For example, if the rotary axis J6 of the wrist flange 2b is distant from the optical axis of the camera 3, the image B rotates about the rotary axis J6 of the wrist flange 2b as the wrist flange 2b rotates, as described above. In order to rotate the image B about the center thereof, the control unit 4 may move the robot arm 2a so that the camera 3 rotates about the optical axis thereof on the basis of the relationship between the motion of the wrist flange 2b and the motion of the camera 3.

For example, if the camera 3 is attachable/detachable, the position and the orientation of the camera 3 relative to the wrist flange 2b can change each time the camera 3 is attached to the robot arm 2a or the tool 2c. Because the robot controller 1 can estimate the motion and the orientation of the camera 3 in the world frame by using the 9-axis sensor 13, complicated calibration for setting the position and the orientation of the camera 3 with respect to the wrist flange 2b is not necessary. Therefore, with simple settings alone, the motion of the camera 3 can be accurately controlled by means of the control unit 4.

A keep-out zone into which the robot arm 2a is inhibited from entering may be set within the movable area of the robot arm 2a. In such a case, the robot controller 1 may inform the operator of the keep-out zone via the operation panel 5. For example, if a tap position is a position within the keep-out zone, the robot controller 1 may display, on the display unit 6, visual information indicating that the tap position is within the keep-out zone.

The above-described embodiment has been described by way of an example where the robot operating device includes only one camera 3. Instead of this, the robot operating device may include a plurality of the cameras 3. In this case, the display unit 6 may display images B acquired by the plurality of cameras 3. The above-described embodiment has been described by way of an example where the robot mechanical unit 2 is a 6-axis vertical articulated robot. Instead of this, the robot mechanical unit 2 may be a robot of another type. For example, the robot mechanical unit 2 may be a vertical articulated robot with a number of axes other than six, a horizontally articulated robot, or a parallel link robot.

The invention claimed is:

1. A robot operating device comprising:
a camera that is attached to a distal end of a robot arm or a position adjacent to the distal end and that is configured to acquires an image;
a touchscreen display that is configured to displays the image acquired by the camera and receives a tap operation or a swipe operation performed by an operator on the image displayed on the touchscreen display; and
a controller which is configured to moves, just after the tap operation or the swipe operation, the robot arm based on a difference between a tapped position of the tap operation and a predetermined position in the image displayed on the touchscreen or based on swipe amount of a finger in the swipe operation received by the touchscreen display, wherein the touchscreen display is further configured to continue, during movement of the robot arm based on the tap operation or the swipe operation, to display the image which is acquired by the camera and which changes in response to the movement of the robot arm.

2. The robot operating device according to claim 1, wherein the touchscreen display is further configured to receives the tap operation for specifying an arbitrary position in the image, and the controller is further configured to moves the robot arm so as to move the arbitrary position towards a predetermined position in the image.

3. The robot operating device according to claim 2, wherein the controller is further configured to calculates a relationship between a stroke of the robot arm and a movement amount of an object in the image and, based on the calculated relationship, calculates the stroke of the robot arm necessary for moving the arbitrary position to the predetermined position.

4. The robot operating device according to claim 2, wherein the predetermined position in the image is a center of the image.

5. The robot operating device according to claim 1, wherein the touchscreen display is further configured to receives touch operation of a zoom command for the image, and the controller is further configured to moves the robot arm so as to move the camera in an optical axis direction of the camera based on the touch operation.

6. The robot operating device according to claim 1, wherein the touchscreen display is further configured to receives a touch operation of a rotation command on the image, and the controller is further configured to moves the robot arm so as to rotate the camera about an optical axis of the camera or about an axis parallel to the optical axis based on the touch operation.

7. The robot operating device according to claim 1, further comprising:
a 9-axis sensor attached to the camera, wherein the controller is further configured to estimates an orientation of the camera in a coordinate system of the robot arm based on a detected value detected by the 9-axis sensor and controls the robot arm based on the orientation of the camera.

8. A robot, comprising:
a robot mechanical unit;
a robot operating device comprising a camera that is attached to a distal end of a robot arm or a position adjacent to the distal end and that acquires an image;
a touchscreen display that is configured to displays the image acquired by the camera and receives a tap operation or a swipe operation performed by an operator on the image displayed on the touchscreen display; and
a controller which is configured to moves, just after the tap operation or the swipe operation, the robot arm based on a difference between a tapped position of the tap operation and a predetermined position in the image displayed on the touchscreen or based on swipe amount of a finger in the swipe operation received by the touchscreen display, wherein the touchscreen display is further configured to continue, during movement of the robot arm based on the tap operation or the swipe operation, to display the image which is acquired by the camera and which changes in response to the movement of the robot arm.

9. A robot operating method comprising:
acquiring an image with a camera attached to a distal end of a robot arm or a position adjacent to the distal end;
displaying, on a touchscreen display, the image acquired by the camera;

receiving a position of a touch operation performed by an operator on the displayed image or a swipe amount of a finger in a swipe operation performed by the operator on the displayed image; and moving, just after the tap operation or the swipe operation, the robot arm based on a difference between a tapped position of the tap operation and a predetermined position in the image displayed on the touchscreen or based on the swipe amount of the finger in the swipe operation wherein the touchscreen display continues, during movement of the robot arm based on the tap operation or the swipe operation, to display the image which is acquired by the camera and which changes in response to the movement of the robot arm.

10. The robot operating device comprising:

a camera that is attached to a distal end of a robot armor a position adjacent to the distal end and that acquires an image;

a touchscreen display that is configured to display the image acquired by the camera and receive a tap operation or a swipe operation performed by an operator on the image displayed on the touchscreen display; and a controller which is configured to move the robot arm based on a difference between a tapped position of the tap operation and a predetermined position in the image displayed on the touchscreen or based on swipe amount of a finger in the swipe operation received by the touchscreen display, a deadman switch, wherein movement of the robot arm based on the tap operation or the swipe operation is performed only when the tap operation or the swipe operation is performed while the deadman switch is being pushed.

\* \* \* \* \*